(12) United States Patent
Sasaki et al.

(10) Patent No.: US 7,968,064 B2
(45) Date of Patent: Jun. 28, 2011

(54) METHOD FOR EXTRACTION OF METALS BY METHYLIMINOBISALKYLACETAMIDE

(75) Inventors: Yuji Sasaki, Ibaraki (JP); Yoshihiro Kitatsuji, Ibaraki (JP); Takaumi Kimura, Ibaraki (JP); Makoto Arisaka, Ibaraki (JP)

(73) Assignee: Japan Atomic Energy Agency, Ibaraki (JP)

( * ) Notice: Subject to any disclaimer, the term of this patent is extended or adjusted under 35 U.S.C. 154(b) by 0 days.

(21) Appl. No.: 12/461,676

(22) Filed: Aug. 20, 2009

(65) Prior Publication Data

US 2010/0099938 A1 Apr. 22, 2010

(30) Foreign Application Priority Data

Oct. 21, 2008 (JP) ................................. 2008-270791

(51) Int. Cl.
*C07C 23/00* (2006.01)

(52) U.S. Cl. .................. 423/9; 423/22; 423/49; 423/54; 210/634; 210/656; 210/679; 588/20; 588/313; 588/410; 588/414

(58) Field of Classification Search ..................... 588/20, 588/313, 410, 414; 423/9, 22, 49, 54; 210/634, 210/656–688
See application file for complete search history.

(56) References Cited

FOREIGN PATENT DOCUMENTS

JP 2009-114129 * 5/2009

OTHER PUBLICATIONS

"Comparative Synergistic (Technetium-Actinide) Extraction Chemistry by Tributylphosphate and Some Amide Extractants," Condamines et al., CEA-CON—11456 (1993), 8 pages.
"Solvent Extraction of Tc(VII) and Re(VII) from Nitric Acid Solution with the Mixture of CMPO and TBP," Takeuchi et al., Radiochimica Acta 63, 1993, pp. 97-100.
"Highly Selective Extraction of $TcO_4^-$, $ReO_4^{2-}$, and $MoO_{42}^-$ by the New Ligand, 2,2'- (Methylimino)bis(*N,N*-Dioctylacetamide) (MIDOA)," Sasaki et al., Chemistry Letters vol. 36, No. 11, 2007, pp. 1394-1395.

* cited by examiner

*Primary Examiner* — Steven Bos

(57) ABSTRACT

The present invention provides a method for extraction of metals selected from Cr, Mo, Pd, Tc, W, Re, and Pu using a new extractant of methyliminobisalkylacetamide represented by a formula (I):

$$CH_3-N-(CH_2CONR_2)_2 \qquad (I)$$

wherein R represents an alkyl group having 8-12 carbon atoms.

4 Claims, 3 Drawing Sheets

METHOD FOR EXTRACTION OF METALS BY METHYLIMINOBISALKYLACETAMIDE

CROSS-REFERENCE TO RELATED APPLICATIONS

This application is based upon and claims the benefit of priority from prior Japanese Patent Application No. 270791/2008 filed on Oct. 21, 2008, the entire contents of which are incorporated herein by reference.

BACKGROUND OF THE INVENTION

1. Field of the Invention

The present invention relates to a method for extraction of metals selected from Cr, Mo, Pd, Tc, W, Re and Pu by methyliminobisalkylacetamide.

2. Prior Art

High-level radioactive liquid waste in the field of atomic energy contains metals such as Pd, Tc, Mo, and Pu. Since Tc has a long half-life period, and therefore has strong radioactivity in high-level radioactive liquid waste after interim storage; thus, there remains a potential threat for a long period of time. Mo has a limit of concentration in vitrified waste. (Advanced Nuclear System Research and Development Directorate of Japan Atomic Energy Agency, "Feasibility Study on Commercialized Fast Reactor Cycle Systems Technical Study Report of Phase II, (2) Nuclear Fuel Cycle System", JAEA-Research 2006-043 (2006)). Pu is an element that is contained in large amount in used uranium fuels, and can be used as fuels in fast breeder reactors. These metals such as Pd, Tc, Mo, and Pu are thus required to be separated and recovered from high-level radioactive liquid waste.

However, since these metals are present in the form of anions, such as $TcO_4^-$ and $MoO_4^-$, in aqueous solutions, it is difficult to extract the metals by a common extractant (e.g., ALIQUAT 336, tetraphenylarsonium salts). Various methods for extraction of Tc have been proposed ("COMPARATIVE SYNERGISTIC (TECHNETIUM-ACTINIDE) EXTRACTION CHEMISTRY BY TRIBUTYLPHOSPHATE AND SOME AMIDE EXTRACTANTS" N. Condamines, C. Musikas and L. H. Delmau, CEA-CON-11456 (1993) and "Solvent Extraction of Tc(VII) and Re(VII) from Nitric Acid Solution with the Mixture of CMPO and TBP" M. Takeuchi, S. Tanaka, M. Yamawaki, Radiochim. Acta 63 (1993) 97-100), but all of the methods are inadequate because distribution ratios are low and Tc is extracted together with uranium. Further, Pd in high-level radioactive liquid waste is distributed into an organic phase in a solvent extraction system. However, when a concentration of Pd in the organic phase increases, a heavy organic phase (third phase) in which Pd are concentrated are formed. This sometimes causes a problem that lines of a mixer-settler equipment are clogged during process operation. Concerning to Cr, W, and Re, they are present in the form of oxoacids ($Cr_2O_7^{2-}$, $WO_4^{2-}$, $ReO_4^-$) in aqueous solutions, and it is generally difficult to recover from the solutions. Further, since high-level radioactive liquid waste is a nitric acid aqueous solution, a preferred organic solvent for use in solvent extraction is dodecane, which is stable and has low toxicity, but conventional extractants cannot be dissolved-well in n-dodecane.

SUMMARY OF INVENTION

Recovery of Cr, Mo, Pd, Tc, W, Re, and Pu contained in high-level radioactive liquid waste has the following problems:

(1) since Cr, Mo, Tc, W, and Re are present in the form of oxoacids in aqueous solutions, chemical separation of Cr, Mo, Tc, W, and Re is difficult;

(2) since Mo, Tc, Pd, and Pu are present in high-level radioactive liquid waste at high concentrations, complicated procedures and operations are required in conventional separation;

(3) although solvent extraction requires an extractant having high affinity with a target metal, none of extractants that are currently proposed have affinity with Cr, Mo, Pd, Tc, W, Re, or Pu contained in high-level radioactive liquid waste;

(4) since high-level radioactive liquid waste is a nitric acid aqueous solution, a preferred organic solvent for use in solvent extraction is dodecane, which is stable and has low toxicity, but conventional extractants (e.g., ALIQUAT 336, tetraphenylarsonium salts) cannot be dissolved-well in n-dodecane;

(5) conventional extractants (e.g., ALIQUAT 336, tetraphenylarsonium salts) are highly toxic, and cannot be incinerated; and (6) conventional extractants (e.g., ALIQUAT 336, tetraphenylarsonium salts) are uneconomical.

An object of the present invention is to provide methods for efficient extraction of metals, such as Cr, Mo, Pd, Tc, W, Re, and Pu, present in high-level radioactive liquid waste by simple procedures and operations using an extractant that has low toxicity, can be incinerated, and is economical.

The present inventors intensively and extensively studied to solve the above problems. Consequently, they have found that use of an acetamide compound having a specific structure as an extractant solves the above problems. By this finding, the present invention was completed.

Specifically, the present invention provides methods for extraction of metals, such as Cr, Mo, Pd, Tc, W, Re, and Pu, from high-level radioactive liquid waste, comprising a step of using as an extractant methyliminobisalkylacetamide (hereinafter "MIDAA") represented by formula (I):

$$CH_3-N-(CH_2CONR_2)_2 \qquad (I)$$

wherein R represents an alkyl group having 8-12 carbon atoms.

Specific examples of R in the formula (I) include octyl groups, decyl groups, and dodecyl groups; octyl groups are especially preferred. Specific examples of MIDAA used as an extractant in the present invention include methyliminobisdioctylacetamide, methyliminobisdidecylacetamide, and methyliminobisdidodecylacetamide; methyiminobisdioctylacetamide is especially preferred. MIDAA is highly hydrophobic, has high solubility in n-dodecane, and causes no reaction in the air, such as degradation and sublimation, so that it is stable in the air. Further, MIDAA is a tridentate ligand capable of forming a complex with metals such as Cr, Mo, Pd, Tc, W, Re, and Pu. Furthermore, MIDAA is a compound consisting of carbon, hydrogen, oxygen, and nitrogen; therefore, amounts of secondary waste can be reduced.

MIDAA can be prepared as follows. An acid chloride is prepared using 3-methyliminodiacetic acid and thionyl chloride with argon bubbling. Then, a secondary amine compound, such as di-n-octylamine and di-n-dodecylamine, is added in the ice bath to react gradually in the presence of triethylamine. The resulting product is washed with water, sodium hydroxide, and hydrochloric acid solution, and passed through a silica gel column again and again to be isolated and purified.

It is generally considered that use of thionyl chloride in an amount of 100-120 parts by weight with respect to 100 parts by weight of 3-methyliminodiacetic acid enables adequate production of 3-methyliminodiacetic chloride. Use of the thionyl chloride in an amount larger than the above range causes a large amount of residues in the reaction solution, and this is disadvantageous in purification and is not economical.

Chlorination is performed by gradually adding thionyl chloride with stirring in an argon atmosphere (2 to 3 hours). A solvent for chlorination is gradually heated to evaporate excess thionyl chloride (boiling point: 79° C.). In chlorination, a solvent such as ethyl acetate can be used.

It is generally considered that use of a secondary amine compound in an amount of 100-120 parts by weight with respect to 100 parts by weight of the compound obtained by the chlorination enables adequate reaction of acid chloride. Use of the secondary amine compound in an amount larger than the above range causes a large amount of residues in the reaction solution, and this is disadvantageous in purification and is not economical.

Extraction according to the present invention is applicable to processing of various liquid wastes such as high-level radioactive liquid waste from systems using atomic energy. Examples of metals that should be separated by extraction include Cr, Mo, Pd, Tc, W, Re, and Pu.

Among MIDAA listed above, methyliminobisdioctylacetamide (hereinafter "MIDOA") is especially preferred, because:

(1) MIDOA is a tridentate ligand with N donor, and is capable of forming strong bonds with oxoacids of Cr, Mo, Tc, W, and Re;

(2) MIDOA is capable of forming strong bonds with Pd and Pu, which are contained in large amounts in high-level liquid waste;

(3) MIDOA can be supported on chromatography resin;

(4) MIDOA is highly hydrophobic, is soluble in dodecane, and can dissolve in many other organic solvents. Further, relatively high distribution ratios of Cr, Mo, Pd, Tc, W, Re, and Pu are obtained in aqueous solutions of nitric acid, hydrochloric acid, and perchloric acid. The distribution ratio is defined as the ratio of metal concentration in the organic phase against that in the aqueous phase ([metal]org/[metal]aq);

(5) MIDOA is an organic compound consisting of carbon, nitrogen, oxygen, and hydrogen, can be incinerated, and cause less secondary waste. Further, unlike organophosphorus compounds and amine compounds, MIDOA has low toxicity; and (6) it is easy to produce MIDOA and derivatives that have the same central frame as that of MIDOA and contain alkyl groups other than octyl groups (specific examples include methyliminobisdihexylacetamide, methyliminobisdidecylacetamide, and methyliminobisdidodecylacetamide).

Extraction of the present invention can adopt a commonly-used procedure, except that MIDAA is used.

MIDAA is dissolved into n-dodecane (solvent), and the resulting solution is mixed with high-level radioactive liquid waste and shaken (liquid-liquid mixing). Dodecane, octanol, nitrobenzene, chloroform, toluene, and the like can be used as a solvent, but n-dodecane is most preferred in view of safety.

In cases of recovering Tc, it is preferable that MIDAA be used such that a molarity of MIDAA in the solution is 0.1-0.2 M. In cases of quantitatively recovering Tc contained in high-level radioactive liquid waste at a high concentration, a concentration higher than the above range can be employed.

High-level radioactive liquid waste is generally nitric acid. Examples of acids used in this invention include nitric acid, hydrogen peroxide, hydrochloric acid, and sulfuric acid, but nitric acid solutions are common. The acid concentration is generally 1 M to 6M.

A mix ratio of MIDAA and high-level radioactive liquid waste that is to be processed varies according to an amount of aimed metals in the waste, but it is generally preferable that the mix ratio be in the range of from 0.01:1 to 1:0.01 (=an aqueous-phase:organic-phase volume ratio), since it is known that general solvent extraction utilizes at a 1:1 ratio.

It is preferable that the shaking be carried out at room temperature or 25° C. for 10-20 minutes.

The scope of the extraction of the present invention includes separation by extraction chromatography. Specifically, methanol in which MIDAA is dissolved (MIDAA: 0.1 M, 10 ml) is mixed with amberlite (registered trademark) XAD resin (Rohm and Haas Company, U.S.A.) (about 2 g), and the resulting mixture is stirred for 1 hour at room temperature. Then, solid and liquid phases are separated, and only the solid phase is recovered and dried to be used as MIDAA-impregnated resin. The resulting MIDAA-impregnated resin is charged into a column having a diameter of 1-10 cm for chromatography separation. Tc is separated and recovered by making good use of different conditions of acid concentrations for adsorption and elution of Tc (e.g., diluted nitric acid with a concentration of 0.1 M or the like for adsorption, and concentrated nitric acid with a concentration of 5 M or higher for elution).

MIDAA for use as an extractant in the present invention enables efficient extraction of metals contained in aqueous solutions, such as Cr, Mo, Pd, Tc, W, Re, and Pu, by simple procedures and operations, has low toxicity, can be incinerated, and is economical.

Further, extraction of metals according to the present invention enables easy chemical separation of metals, such as Cr, Mo, Pd, Tc, W, Re, and Pu, from high-level radioactive waste. Furthermore, extraction according to the present invention is applicable to separation by extraction chromatography.

EXAMPLES

The present invention is specifically described by the following Examples and Comparative Examples. The present invention, however, is not limited to the following descriptions.

Example 1

Preparation of MIDOA

Chlorination was performed using 10 g of 3-methyliminodiacetic acid (Wako Pure Chemical Industries, Ltd.) and 20 g of thionyl chloride. One hundred grams of ethyl acetate was used as a solvent. Reaction was performed at 50-60° C. for 2-3 hours.

Thereafter, 20 g of dioctylamine being cooled at 5° C. or below was added to the reaction solution over 2-3 hours. After the addition was completed, the mixture was left to react overnight. After the reaction was completed, the reaction product was isolated and purified by a silica gel column to obtain MIDOA. The resulting MIDOA was highly soluble in dodecane (indicating a possibility of preparing a solution with a concentration of 1.1 M or higher), which is a nonpolar solvent.

Example 2

An experiment of solvent extraction of Cr, Mo, Pd, Tc, W, Re, and Pu was performed using 0.1 M MIDOA/n-dodecane solution as the organic phase and nitric acid aqueous solutions with different concentrations shown in Table 1 as the aqueous phase.

TABLE 1

Relationship between metal distribution ratio and nitric acid concentration in the case of using 0.1 M MIDOA/dodecane

| Nitric Acid Concentration | Distribution Ratio | | | | | | |
|---|---|---|---|---|---|---|---|
| | Cr | Mo | Tc | W | Re | Pd | Pu |
| 0.1 M | 26.3 | 28.4 | 926 | 25 | 178 | | 2.7 |
| 0.5 | 10.5 | 7.85 | 83 | 17 | 32 | | 11 |
| 1 | 4.9 | 6 | 53 | 7.4 | 14 | | 50 |
| 3 | 1.7 | 1.4 | 3 | | 0.49 | 640 | 80 |

Figure 1:
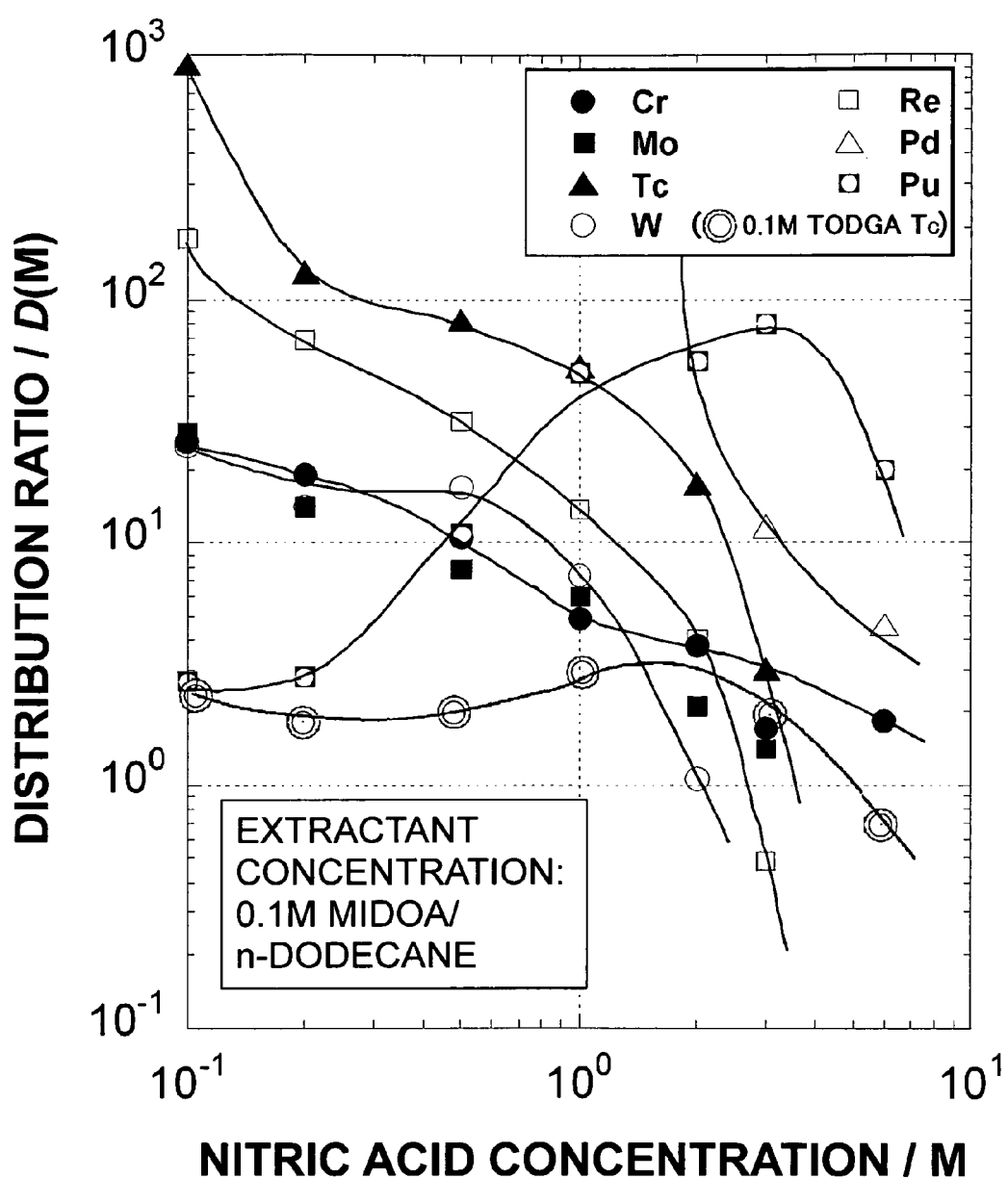
FIG. 1 is a graph showing a relationship between D(M) values (the ratio of metal concentration in the organic phase of MIDOA/n-dodecane against that in the aqueous phase of $HNO_3$ containing Cr, Mo, Pd, Tc, W, Re and Pu) and the concentration (M) of $HNO_3$.

In the experiment of solvent extraction, the same amounts (volume ratio) of a nitric acid aqueous solution containing metal ions and the 0.1 M MIDOA/dodecane solution were mixed, and then shaken at 25° C. for 30 minutes to separate the phases. Beta rays of the aqueous and organic phases after the shaking were measured by a liquid scintillation counter to determine distribution ratios of the metals. The results are shown in FIG. 1. In FIG. 1, the horizontal axis refers to the nitric acid concentrations and the vertical axis refers to the distribution ratios. FIG. 1 shows the dependence of the distribution ratios of the metals on the nitric acid concentrations in the experiment in which a dodecane solution containing 0.1 M extractant was used as an extraction solvent and the nitric acid concentration in the aqueous phase was changed within the range of 0.1 M to 6 M. FIG. 1 also shows the results of the experiment of Tc extraction using tetraoctyldiglycolamide (TODGA) as an extractant. It is recognized from FIG. 1 that MIDOA exhibited a higher Tc distribution ratio than that of TODGA, with a highest ratio of about 1000, and that the distribution ratio decreased as the nitric acid concentration increased. The results show that Tc formed a 1:1 (metal ions:MIDOA) complex in the organic phase. The results also show that the distribution ratios of all elements except for Pu decreased as the acid concentration increased, and high distribution ratios were exhibited at diluted $HNO_3$. FIG. 1 shows that the distribution ratios of all elements exceeded 10 as a result of multi-stage extraction (a distribution ratio of 3×3×3=27 was obtained by repeating extraction three times, when D=3) to enable quantitative recovery.

Example 3

Distribution ratios were measured using MIDOA-impregnated resin.

MIDOA was dissolved in methanol to obtain a solution with a concentration of 0.1 M. Amberlite (registered trademark) XAD-4 resin (Organo Corporation) was added to the solution, and the mixture was stirred for 1 hour at room temperature. Then, solid and liquid phases were separated, and only the solid phase was recovered and dried to be used as MIDOA-impregnated resin. An amount of impregnated MIDOA was 0.4 g with respect to 1 g of resin.

Then, 0.1 g of resin and 1 ml of a nitric acid aqueous solution containing various metals were mixed, and amounts of metals that were adsorbed onto the resin were determined by using following equation 1 for calculating distribution ratios Kd:

$$(Kd = (C_0 - C)/C_0 \times V/W) \quad \text{[Equation 1]}$$

$C_0$: Initial concentration of metals in the solution,
C: Concentration of metals in the solution after the distribution,
V: Volume of the solution (ml),
W: Weight of the resin (g).

Figure 2:
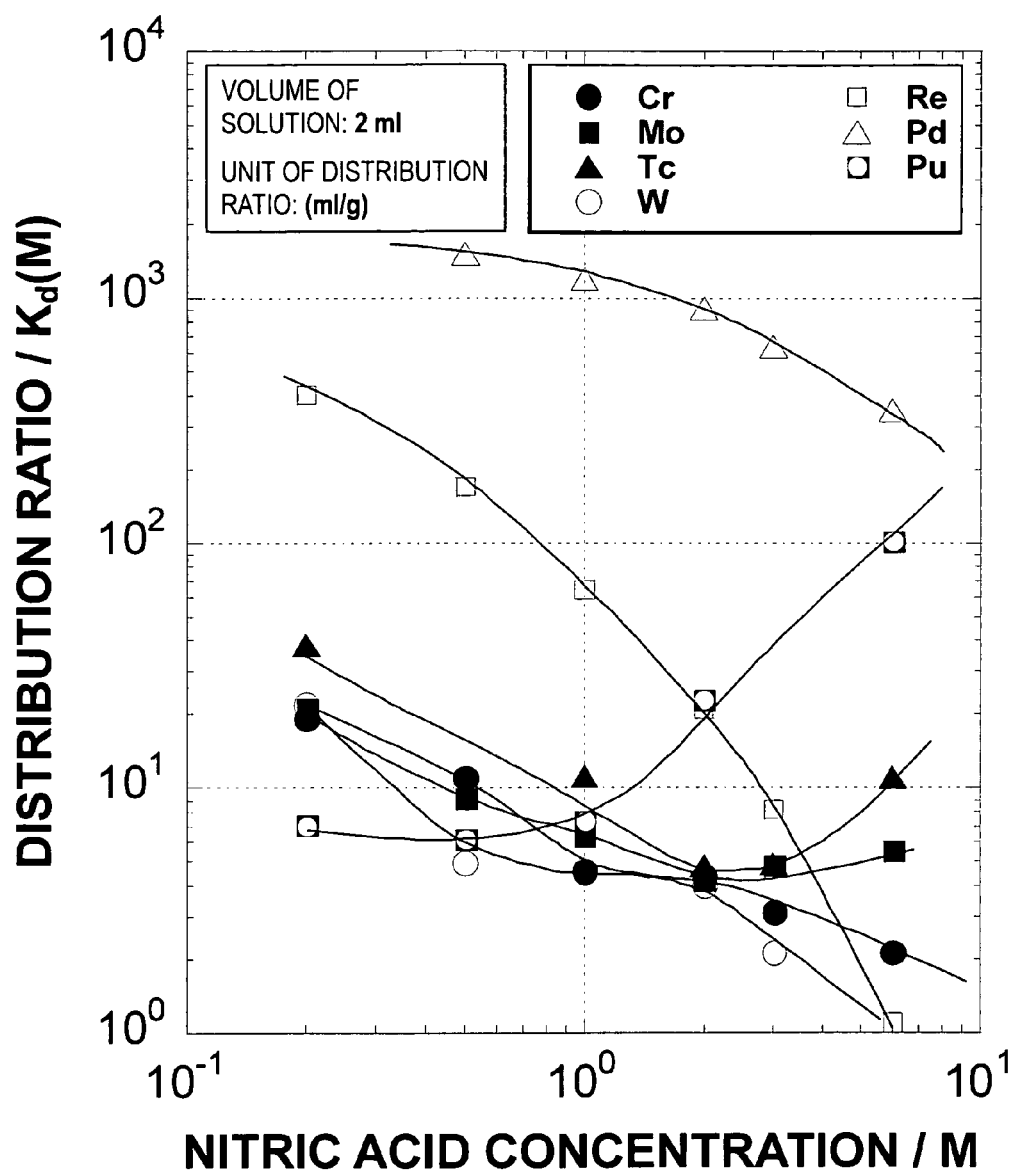
FIG. 2 is a graph showing a relationship between D(M) values (the ratio of metal concentration in the solid phase of resin impregnated with MIDOA against that in the aqueous phase of $HNO_3$ containing Cr, Mo, Pd, Tc, W, Re and Pu) and the concentration (M) of $HNO_3$.

The relationships between the distribution ratios and the nitric acid concentrations are shown in Table 2 and FIG. 2.

TABLE 2

Relationship between distribution ratio and nitric acid concentration in the case of using MIDOA-impregnated resin

| Nitric Acid Concentration | Distribution Ratio | | | | | | |
|---|---|---|---|---|---|---|---|
| | Cr | Mo | Tc | W | Re | Pd | Pu |
| 0.2 M | 19 | 21 | 39 | 22 | 403 | 760 | 7.1 |
| 0.5 | 11 | 9 | | 5 | 170 | 1500 | 6.2 |
| 1 | 4.6 | 6.4 | 11 | 4.7 | 65 | 1200 | 7.4 |
| 3 | 3.1 | 4.8 | 4.9 | 4 | 21 | 910 | 23 |

The results show that the behavior is the same as that in the liquid-liquid distribution in Example 2. It was confirmed that distribution ratios of Cr, Mo, Tc, W, Re, and Pd exceeded 10, with which quantitative recovery can be expected, when diluted nitric acid (about 0.1-0.5 M) was used, and that the distribution ratio of Pu exceeded 10, with which quantitative recovery can be expected, when concentrated nitric acid (0.5-6 M) was used.

It was found that an extraction chromatography resin could be easily prepared by supporting MIDOA onto a resin, and that separation and recovery of Cr, Mo, Pd, Tc, W, Re, and Pu could be achieved by use of the extraction chromatography resin.

Example 4

An experiment of solvent extraction of Cr, Mo, Pd, Tc, W, Re, and Pu was performed using 0.1 M MIDOA/n-dodecane solution as the organic phase and perchloric acid aqueous solutions with various concentrations shown in Table 3 as the aqueous phase. In the experiment of solvent extraction, the same amounts (volume ratio) of a nitric acid aqueous solution containing metal ions and 0.1 M MIDOA/dodecane solution (0.1M MIDOA/n-dodecane) were mixed, and the mixture was shaken. Then, distribution ratios of the metals in the aqueous and organic phases after the shaking were measured. The results are shown FIG. 3.

TABLE 3

Relationship between distribution ratios of various metals and perchloric acid concentration in the case of using 0.1 M MIDOA/dodecane

| Perchloric Acid Concentration | Distribution Ratio | | | | | | |
|---|---|---|---|---|---|---|---|
| | Cr | Mo | Tc | W | Re | Pd | Pu |
| 0.1 M | 0.59 | 20 | 2.9 | 5.4 | 0.98 | 161 | |
| 0.5 | 0.22 | 2.3 | 0.64 | 1.4 | 0.2 | 15 | 32 |
| 1 | 0.25 | 1.8 | 0.32 | | 0.12 | 5.5 | 15 |
| 3 | | | 0.21 | | | 1.83 | 1.4 |

Figure 3:
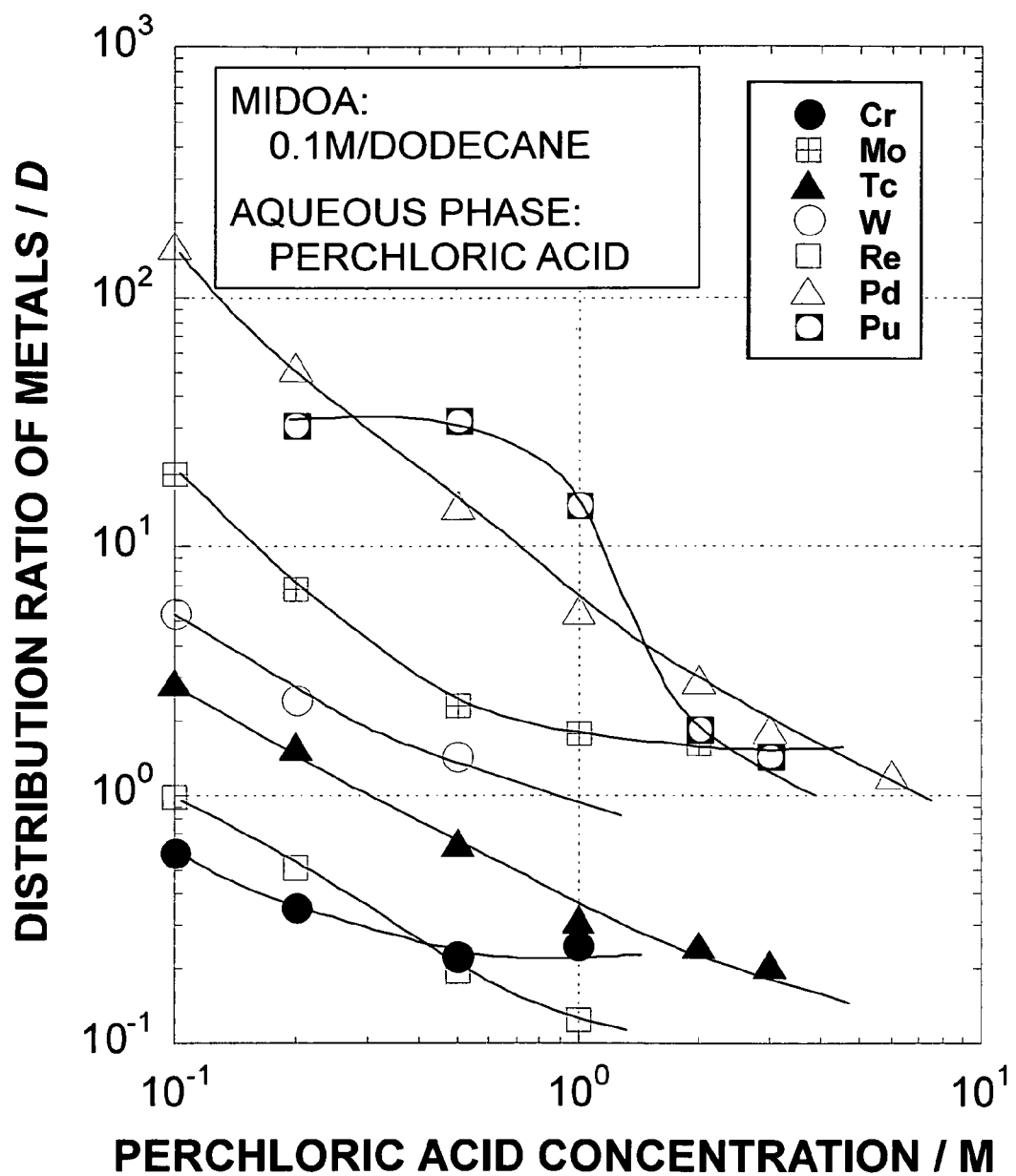
FIG. 3 is a graph showing a relationship between D(M) values (the ratio of metal concentration in the organic phase of MIDOA/n-dodecane against that in the aqueous phase of perchloric acid containing Cr, Mo, Pd, Tc, W, Re and Pu) and the concentration (M) of the acid.

The results shown in FIG. 3 indicate that the elements except for Cr and Re can be quantitatively recovered by multi-stage extraction. Specifically, the final distribution ratio (2.9×2.9×2.9=24) of Tc, which had the lowest distribution ratio (distribution ratio: 2.9), was obtained by repeating the solvent extraction three times under the conditions. Required conditions that enabled recovery of Cr and Re (e.g., distribution ratio of 10 or greater) could be reached by increasing the extractant concentration.

Example 5

An experiment of solvent extraction of Cr, Mo, Pd, Tc, W, Re, and Pu was performed using 0.1 M MIDOA/n-dodecane solution as the organic phase and 0.2 M hydrochloric acid aqueous solution as the aqueous phase. The distribution ratios were as follows: Cr (<0.07), Mo (3.2), Pd (69), Tc (4), W (0.4), Re (15), and Pu (7.9). It was found that quantitative recovery of especially Mo, Pd, Tc, Re, and Pu could be achieved by multi-stage extraction (a distribution ratio of 33 was obtained by repeating the extraction three times) in the extraction system.

INDUSTRIAL APPLICABILITY

The present invention enables efficient separation of Cr, Mo, Pd, Tc, W, Re, and Pu from high-level radioactive liquid waste and various acid solutions. Long-term toxicity of Tc and Pu can be eliminated by subjecting Tc and Pu to nuclear transformation technology, and recovery of Mo reduces production of vitrified waste. Other elements can be reused as noble metals.

What is claimed is:

1. A method for extraction of at least one metal selected from the group consisting of Cr, Mo, Pd, Tc, W, Re, and Pu, the method comprising:
    mixing a perchloric acid aqueous solution or a hydrochloric acid aqueous solution which contains said metal ions with an organic solution containing an extractant of methyliminobisalkylacetamide represented by formula (I):

$$CH_3—N—(CH_2CONR_2)_2 \qquad (I)$$

wherein R is an alkyl group having 8-12 carbon atoms;
shaking the mixture; and
extracting the metal ions from the mixture into an organic phase containing the organic solution.

2. A method in accordance with claim 1, wherein the methyliminobisalkylacetamide is methyliminobisdioctylacetamide.

3. A method of claim 1, wherein said at least one metal is extracted from a high-level radioactive liquid waste.

4. A method for extraction of at least one metal selected from the group consisting of Cr, Mo, Pd, Tc, W, Re, and Pu, the method comprising:
    mixing a perchloric acid aqueous solution or a hydrochloric acid aqueous solution which contains said metal ions with an extractant-impregnated resin of methyliminobisalkylacetamide represented by formula (I):

$$CH_3—N—(CH_2CONR_2)_2 \qquad (I)$$

wherein R is an alkyl group having 8-12 carbon atoms; and
extracting the metal ions from the mixture into the extractant-impregnated resin.

* * * * *

UNITED STATES PATENT AND TRADEMARK OFFICE
CERTIFICATE OF CORRECTION

| | | |
|---|---|---|
| PATENT NO. | : 7,968,064 B2 | Page 1 of 1 |
| APPLICATION NO. | : 12/461676 | |
| DATED | : June 28, 2011 | |
| INVENTOR(S) | : Yuji Sasaki et al. | |

It is certified that error appears in the above-identified patent and that said Letters Patent is hereby corrected as shown below:

Column 8, Line 12, In Claim 1, delete "metal ions" and insert -- metal as ions --, therefor.
　　Column 8, Line 31, In Claim 4, delete "metal ions" and insert -- metal as ions --, therefor.

Signed and Sealed this
Fourth Day of September, 2012

David J. Kappos
*Director of the United States Patent and Trademark Office*